United States Patent
Kasheshian et al.

(10) Patent No.: US 11,373,014 B2
(45) Date of Patent: Jun. 28, 2022

(54) CONTROLLING ACCESS TO PERIPHERAL PORTS OF A HOST COMPUTING SYSTEM

(71) Applicant: Hewlett Packard Enterprise Development LP, Houston, TX (US)

(72) Inventors: Vartan Yosef Kasheshian, Houston, TX (US); Lee A. Preimesberger, Houston, TX (US); Jorge Cisneros, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 170 days.

(21) Appl. No.: 16/947,173

(22) Filed: Jul. 21, 2020

(65) Prior Publication Data
US 2022/0027522 A1    Jan. 27, 2022

(51) Int. Cl.
G06F 21/44 (2013.01)
G06F 21/83 (2013.01)
G06F 21/55 (2013.01)
G06F 21/85 (2013.01)

(52) U.S. Cl.
CPC .............. G06F 21/83 (2013.01); G06F 21/44 (2013.01); G06F 21/552 (2013.01); G06F 21/85 (2013.01)

(58) Field of Classification Search
CPC ........ G06F 21/83; G06F 21/44; G06F 21/552; G06F 21/85; G06F 21/73
See application file for complete search history.

(56) References Cited

U.S. PATENT DOCUMENTS

| | | | |
|---|---|---|---|
| 8,230,149 B1 | 7/2012 | Long et al. | |
| 10,409,734 B1 | 9/2019 | Patil et al. | |
| 2008/0263682 A1 | 10/2008 | Fu | |
| 2013/0097694 A1 | 4/2013 | Dang et al. | |
| 2014/0196142 A1* | 7/2014 | Louboutin | G06F 21/445 726/16 |
| 2016/0162419 A1* | 6/2016 | England | G06F 21/85 713/193 |
| 2019/0294777 A1 | 9/2019 | Cobo et al. | |
| 2020/0264962 A1* | 8/2020 | Ichihara | G06F 11/3051 |
| 2022/0019549 A1* | 1/2022 | Liebinger Portela | G06F 11/3051 |

* cited by examiner

*Primary Examiner* — Nelson S. Giddins
(74) *Attorney, Agent, or Firm* — Hewlett Packard Enterprise Patent Department

(57) ABSTRACT

Example implementations relate to system and method of controlling access to ports of a host computing system having a port management integrated-circuit chip (IC), a manageability controller, and a plurality of peripheral device hubs having ports. The IC is to receive a first data from the plurality of peripheral device hubs and communicate the first data to the manageability controller. The first data includes device identifiers of a first peripheral device and a port identifier of the port. Further, the IC is to receive a security action from the manageability controller and implement the security action on the port. The security action is determined based on comparison of the first data and the second data including access control rules, where the security action is linked to each access control rule, and where each access control rule has the port identifier mapped to predetermined device identifiers of a second peripheral device.

20 Claims, 4 Drawing Sheets

CONTROLLING ACCESS TO PERIPHERAL PORTS OF A HOST COMPUTING SYSTEM

BACKGROUND

Peripheral devices, for example, a universal serial bus (USB) device may be attached to peripheral ports/connectors, such as a USB port to connect to a host computing system. USB standard has been developed to allow the peripheral devices (or external devices), such as printers, scanners, keyboards, mouse, modems, cameras, storage devices, and the like to be attached/connected to the host computing system through 4-wire bus. The USB ports may include connector, cable coupled to the connector, and/or communication protocol used in the 4-wire bus for establishing connection, communication, and/or power supply between the host computing system, the peripheral ports, and the peripheral devices.

BRIEF DESCRIPTION OF THE DRAWINGS

Various examples will be described below with reference to the following figures.

Figure 1:
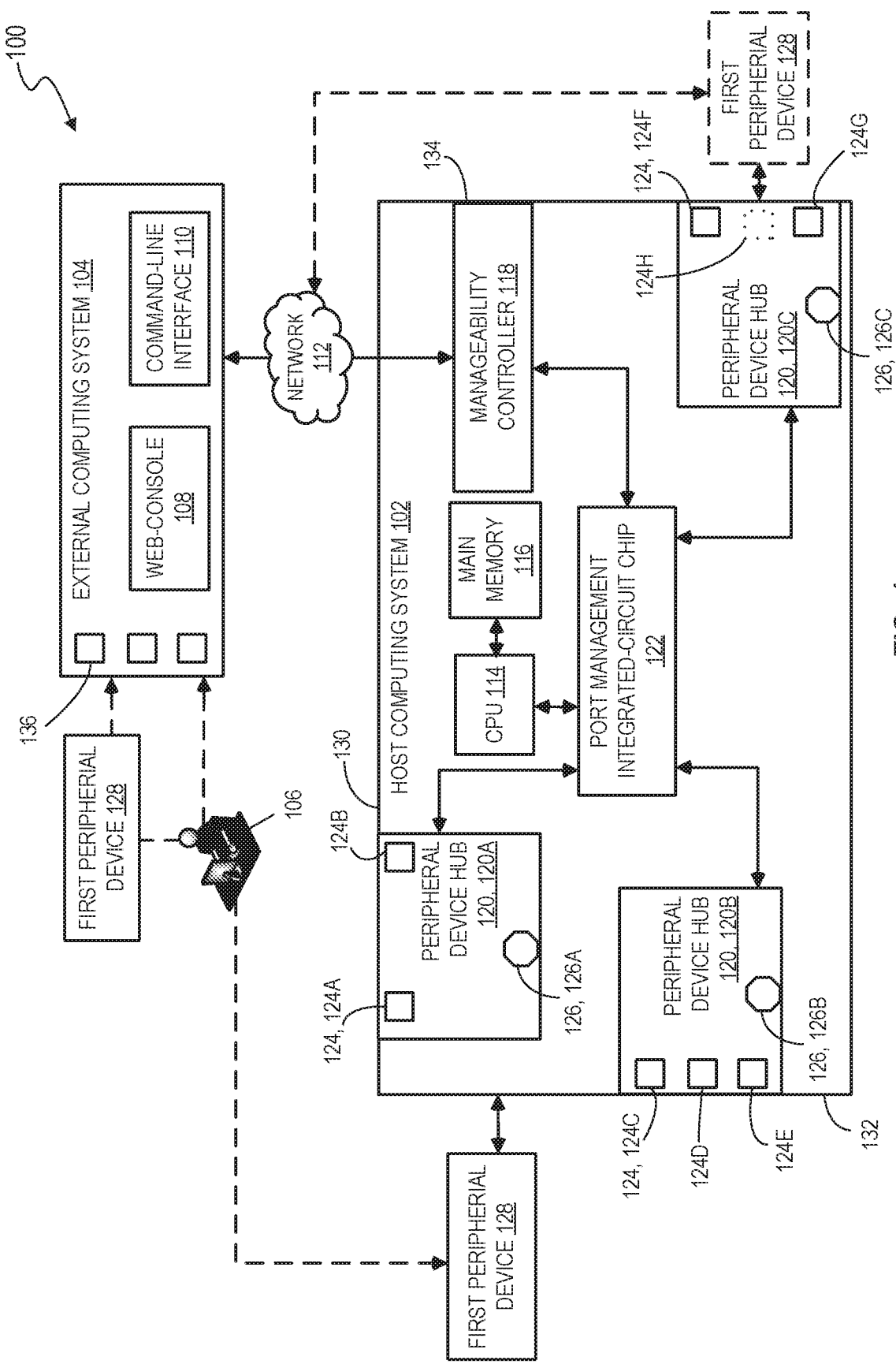
FIG. 1 is an example data center environment having a host computing system, an external computing system, and a peripheral device, in accordance with embodiments of the present disclosure.

Throughout the drawings, identical reference numbers may designate similar, but not necessarily identical, elements. An index number "N" appended to some of the reference numerals may be understood to merely denote plurality and may not necessarily represent the same quantity for each reference numeral having such an index number "N". Additionally, use herein of a reference numeral without an index number, where such reference numeral is referred to elsewhere with an index number, may be a general reference to the corresponding plural elements, collectively or individually. In another example, an index number of "I," "M," etc. can be used in place of index number N. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

The following detailed description refers to the accompanying drawings. Wherever possible, the same reference numbers are used in the drawings and the following description to refer to the same or similar parts. It is to be expressly understood, however, that the drawings are for the purpose of illustration and description only. While several examples are described in this document, modifications, adaptations, and other implementations are possible. Accordingly, the following detailed description does not limit the disclosed examples. Instead, the proper scope of the disclosed examples may be defined by the appended claims.

The terminology used herein is for the purpose of describing examples only and is not intended to be limiting. As used herein, the singular forms "a," "an," and "the" are intended to include the plural forms as well, unless the context clearly indicates otherwise. The term "plurality," as used herein, is defined as two, or more than two. The term "another," as used herein, is defined as at least a second or more. The term "coupled," as used herein, is defined as connected, whether directly without any intervening elements or indirectly with at least one intervening elements, unless otherwise indicated. Two elements may be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, third, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on. Further, as used herein, the term "peripheral device" or "external device" may refer to a type of an electronic device, which is not native to a host computing system, or which is ancillary to the host computing system and may have to be attached by way of plugging or mounting to the host computing system, to put information into and get information out of the host computing system. Similarly, the term "peripheral port" may refer to a type of an electronic connector, which is native to the host computing system, or which is integral to the host computing system and may provision the peripheral device to be attached to put information into and get information out of the host computing system. In some examples, the peripheral device and the peripheral port may function as a plug and a socket of the electronic device. Further, the term "plugging" may refer to fitting the peripheral device physically into the peripheral port of the host computing system. However, the term "mounting" may refer to adding the peripheral device virtually into the host computing system via a secure web-console. Further, it may be noted herein that the term "host computing system" may refer to a compute node, which contains sensitive data, which is connected to a TCP/IP network, including the Internet, and which hosts or executes one or more workloads of the customers. It may be further noted herein that the term "front side" may refer to a side of a host computing system i) having a display section for providing easy access to frequently used devices of the host computing system, such as a power switch, peripheral ports, and display other relevant information about the host computing system to an user/administrator, ii) readily visible to the user when mounted on a rack or an enclosure of a data center, and iii) having one or more clamps for enabling the host computing system to be clamped to the rack or the enclosure. Similarly, the term "rear side" may refer to a mutually opposite side of the front side of the host computing system i) having rarely accessed ports, such as network, power ports to connect the host computing system to the respective supply unit, and ii) concealed from the user/administrator when installed in the rack or the enclosure. The term "peripheral side" may refer to a side of the host computing system, which extends between the front and rear sides of the host computing system.

Figure 4:
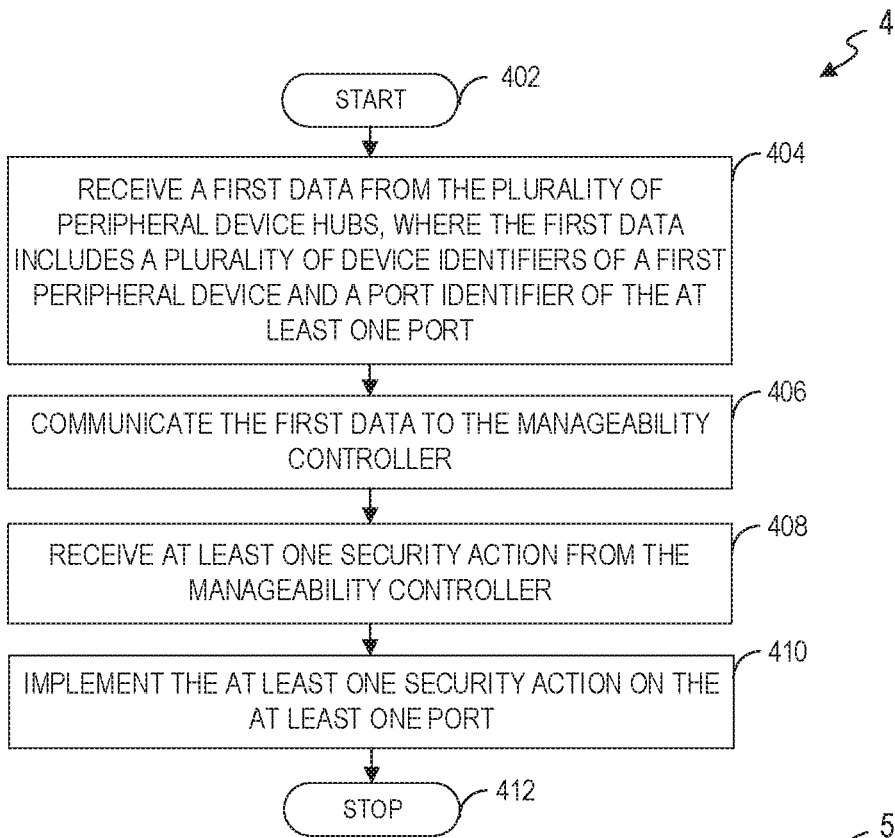
FIG. 4 is a flow diagram depicting a method of controlling access to one or more ports of a host computing system using a port management integrated-circuit chip (IC), in accordance with embodiments of the present disclosure.
Figure 5:
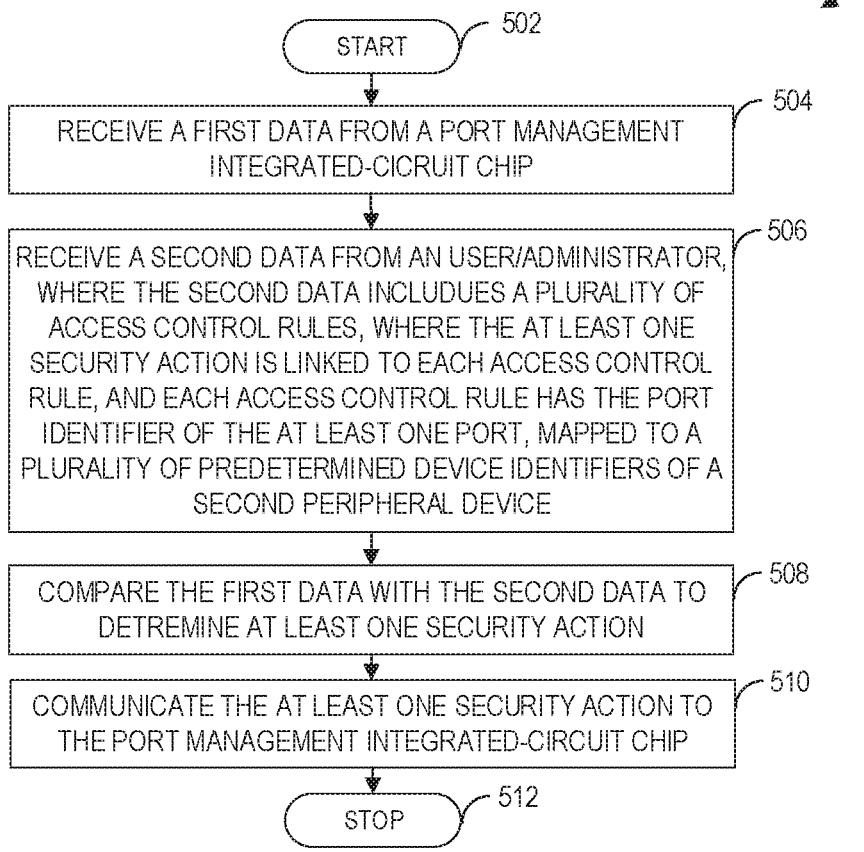
FIG. 5 is a flow diagram depicting a method of determining at least one security action by a manageability controller, in accordance with embodiments of the present disclosure.

For purposes of explanation the present disclosure, certain examples are described with reference to the components illustrated in FIGS. 1-5. The functionality of the illustrated components may overlap, however, and may be present in a fewer or greater number of elements and components. Further, all or part of the functionality of illustrated elements may co-exist or be distributed among several geographically dispersed locations. Moreover, the disclosed examples may be implemented in various environments and are not limited to the illustrated examples. Further, the sequence of operations described in connection with FIGS. 4-5 is an example and is not intended to be limiting. Additional or fewer operations or combinations of operations may be used or may vary without departing from the scope of the disclosed examples. Thus, the present disclosure merely sets forth examples of implementations, and many variations and modifications may be made to the described examples. Such modifications and variations are intended to be included within the scope of this disclosure and protected by the following claims.

The present disclosure describes example implementations of a system and a method of controlling access to one or more peripheral ports of a host computing system, from a peripheral device. In some examples, the peripheral port may be a universal serial bus (USB) port and the peripheral device may be a USB device. It may be noted herein that the terms "peripheral port", "peripheral connector", and "port" may be used interchangeably. Similarly, the terms "peripheral device" and "external device" may be used interchangeably. In one or more examples, the host computing system may include a port management integrated-circuit chip (IC), which may operate as a centralized port manager of the host computing system, to regulate access to the one or more peripheral ports belonging to each peripheral device hub (or USB hub) of the host computing system, from the peripheral device. When the peripheral device is plugged or mounted to the peripheral port, the port management IC may receive data corresponding to the peripheral device and the peripheral port to which the peripheral device is plugged or mounted. The port management IC may then communicate the received data to a manageability controller of the host computing system, and receive at least one security action from the manageability controller. Further, the port management IC may directly implement the at least one security action on the peripheral port. In some examples, the at least one security action may include accepting the peripheral device, rejecting the peripheral device, and disabling the peripheral port. In one or more examples, the manageability controller may compare the received data with a pre-determined data having a plurality of access control rules, to determine the at least one security action, and communicate the determined security action to the port management IC. Once, the port management IC implements the at least one security action on the peripheral port to which the peripheral device is plugged or mounted, the port management IC may then hand over the control of that peripheral port in correspondence to the peripheral device to an operating system (OS) of the host computing system, until the peripheral device is unplugged or unmounted from the peripheral port of the host computing system.

Data centers includes computing systems, such as server systems, storage systems, and various other types of computing systems that contain sensitive data. Generally, customers utilize at least some of the computing systems of the data centers, for running workload based on their business requirement. Accordingly, customers may also spend considerable amount of time, effort, and money in securing the identified computing systems by figuring out security vulnerabilities and remediating the identified security vulnerabilities. However, security vulnerabilities originated due to unrestricted/unauthorized access to peripheral connectors, such as a universal serial bus (USB) port of the computing systems, by using peripheral devices, such as a USB device, may result in losing the sensitive data from the computing systems or introducing malicious (harmful) data into the computing systems.

The current security measures and policies to prevent unauthorized access to the computing systems are focused on what goes into the data center and what comes out from the data center. Often, certain data centers may require user's consent to conduct random or regular pat downs before being granted access to the corresponding data center. While, such a method is effective to restrict unauthorized USB device been brought into or taken out of the data center, but are also not hundred percent effective and not practical to implement. As long as the user has access to the computing systems in the data center, the USB device may get plugged/mounted into the USB port and the sensitive data may be stolen or the malicious data may be introduced. More recently, some other type of the peripheral device, such as a USB ninja cable was used to extract the sensitive data from the computing systems. In such case, the USB ninja cable had physical attributes, which are substantially similar to a normal USB cable, but when such USB ninja cable gets mounted or plugged into the peripheral port, it may function as a virtual keyboard and send pre-programed commands to the computing systems to extract or misuse the sensitive data or introduce the malicious data to the computing systems.

Thus, it is important to prevent extraction and misuse of the sensitive data from the computing systems, and introduction of the malicious data to the computing systems. Even, in instances in which extraction of data is authorized, the copying of the sensitive data onto the peripheral device may raise security concerns, since encryption alone may be insufficient to protect such sensitive data while it is in transit. Further, it is also important to prevent introducing (intentionally or unintentionally) the harmful data into the computing systems using the peripheral devices.

Some existing methods of protecting the USB ports may rely on software-based port management device. However, such software-based port management device may be vulnerable to tampering, requires administration, and maintenance, consumes resources of the computing systems, and may also affect the performance of applications or legitimate peripheral devices. Further, there are no mechanisms to prevent the unauthorized access to peripheral ports, even before the computing systems are powered on.

A technical solution to the aforementioned problems may include utilization of a port management integrated-circuit chip (IC) of a host computing system for controlling access to each peripheral port of the host computing system, from a peripheral device or an external device. In one or more examples, the port management IC may be communicatively coupled to at least one peripheral port of each hub of a plurality of peripheral device hubs, and a manageability controller, such as a baseboard management controller (BMC) of the host computing system. Upon attaching, for example, plugging or mounting of the peripheral device to the at least one peripheral port, the port management IC may negotiate with a corresponding peripheral hub of the plurality of peripheral hubs and the manageability controller, and directly enforce or implement the at least one security action on the at least one peripheral port to regulate the access to the at least one peripheral port from the peripheral device.

For example, upon attaching the peripheral device to the at least one peripheral port, the peripheral device hub hosting the at least one peripheral port, may obtain a first data corresponding to the peripheral device and the at least one peripheral port to which the peripheral device is attached. In some examples, a microcontroller of the peripheral device hub may obtain the first data from the first peripheral device and the at least one peripheral port. The port management IC may then receive the first data from the corresponding peripheral device hub and communicate the first data to the manageability controller. The manageability controller may compare the first data with a second data including a plurality of access control rules, to determine at least one security action based on such comparisons of first and second data. Subsequently, the manageability controller may communicate the at least one security action to the port management IC, In such examples, the port management IC may then directly implement the at least one security action on the at least one peripheral port In some examples, the first data may include a plurality of device identifiers of a first peripheral device and a port identifier of the at least one peripheral port. The second data may include a plurality of access control rules, where each access control rule is linked to the at least one security action. In some examples, the at least one security action includes accepting the peripheral device, rejecting the peripheral device, and disabling the at least one peripheral port. In one or more examples, each access control rule may have at least one predetermined port identifier of the at least one peripheral port, mapped to a plurality of predetermined device identifiers of a second peripheral device. In some examples, the predetermined port identifier of the at least one peripheral port and the plurality of predetermined device identifiers of the second peripheral device, are provided by an authorized user/administrator of the host computing system. It may be noted herein, that the authorized user may directly input/edit the second data to the manageability controller via a web-console or RESTful commands. Since, manageability controller stores the access control rules, it may regulate access to the virtual ports, and the port management IC chip may regulate the access to the physical ports, In one or more examples, the access control rules may be set based on business requirement, and the at least one security action is set based on a type of the peripheral device, for example, a memory device, camera device, a human interface device, such as keyboard, mouse, and the like. In some examples, the at least one peripheral port may a physical port or a virtual port.

It may be noted herein that the port management IC may operate in background without effecting the functionality or operation of an operating system (OS) of the host computing system and applications running on the OS, until the peripheral device is accepted (or verified or approved) by the port management IC for its usage in the host computing system. Thus, the port management IC may insulate the OS and other hardware's of the host computing system from the peripheral device, until it is approved. Later, the port management IC may offload the usage of the peripheral device to the OS, until the peripheral device is unplugged or unmounted from the peripheral port of the host computing system.

Since, the manageability controller may be powered using an auxiliary power rail, the manageability controller may be active, even when the host computing system is switched-off. Thus, the manageability controller may determine the security action and get the security action implemented using the port management IC chip throughout the life cycle of the host computing system so as to control access to the one or more peripheral ports from the peripheral device.

FIG. 1 illustrates an example data center environment 100 in which a host computing system 102 is operably coupled to an external computing system 104, for example, a data center management system for secure management of workloads hosted in the host computing system 102. The example data center environment 100 may be implemented as an enterprise system, or a consumer system, or an industrial system that facilitates to execute or run the workloads for delivering intended service to end-users, and secure the workloads in parallel from one or more security vulnerabilities.

In some other examples, the data center environment 100 may include infrastructure resources, such as a plurality of host computing systems 102, each operably coupled to the external computing system 104. It may be noted herein, that the data center environment 100 may additionally include a lot of other infrastructure resources, such as cooling devices, power supply and management devices, local disks, storage systems, storage area networks (SANs), network devices, networking interconnects, network fabric, storage fabric, and the like, In such examples, the data center environment 100 may provide a cloud service for implementing the workloads of one or more customers by using at least some of the identified infrastructure resources depending on the business requirements of the one or more customers. In some examples, the example data center environment 100 may be owned by the one or more customers or by a vendor, or combinations thereof.

The external computing system 104 may be accessed by an administrator 106 or by user (not shown) to regulate or manage the host computing system 102. It may be noted herein, that the administrator 106 may a representative of the data center environment 100. In the shown example, the external computing system 104 is a server deployed in the data center environment 100. In some other examples, the external computing system 104 may be deployed outside the data center environment 100, without deviating from the scope of the present disclosure. The external computing system 104 may provide a graphical user interface (GUI) or a web-console 108 for the administrator 106 to securely interact and manage the data center environment 100, for example, the host computing system 102. In some other examples, the external computing system 104 may provide a command-line interface 110 for the administrator 106 to interact and manage the host computing system 102.

The host computing system 102 is operably connected to the external computing system 104 over a network 112. In such examples, the network 112 may be a TCP/IP (Transmission Control Protocol/Internet Protocol) network, which is a suite of communication protocols used to interconnect network devices on internet.

In some examples, the host computing system 102 is a server deployed in the data center environment 100 for hosting the workloads of the one or more customers. In one or more examples, the host computing system 102 may include a central processing unit (CPU) 114, a main memory 116, a manageability controller 118, a plurality of peripheral device hubs 120, and a port management integrated-circuit chip (IC) 122.

The CPU 114 may be operably coupled to the main memory 116, and may execute one or more program instructions stored in the main memory 116 to execute software of the host computing system 102, such as an operating system and workloads running on the operating system. It may be noted herein, that the operating system may perform all the basic tasks like file management, memory management, process management, handling input and output, and controlling peripheral devices, such as disk drives, printers, and the like. The workload may be a production workload, a development workload, or a testing workload, depending on the customer's requirement. The workload may contain sensitive information or data, which are proprietary to the customer. In some examples, the production workload may include running an automated teller machine (ATM) application program or a payroll application program or performing live video analytics. Similarly, the development workload may include running a set of processes and programming tools to create a new application program or a software product. Further, the testing workload may include running another set of processes and testing tools to test the new application program or the software product.

The manageability controller 118 may be a service processor, which is capable of monitoring a physical state of the host computing system 102 or other hardware devices with the help of one or more sensors. In some examples, the manageability controller 118 is a baseboard management controller (BMC) embedded within a main circuit board or a motherboard (not shown) of the host computing system 102 to be monitored. In such examples, the main circuit board may also host the CPU 114. The manageability controller 118 may help the administrator 106 to remotely monitor the host computing system 102 and other hardware devices, thereby helping to reduce the operating cost of running the data center environment 100. The manageability controller 118 may have its own internet protocol (IP) address, which may be accessed with the secure web-console 108 or the command-line interface 110. Further, the manageability controller 118 may have its own memory and processor coupled to the memory, and may execute one or more program instructions stored in the memory to monitor the host computing system 102, regulate one or more infrastructure resources of the host computing system 102, and interact with the external computing system 104. The manageability controller 118 may also be powered by an auxiliary power rail (not shown), even when the host computing system 102 is switched-off. Thus, enabling the external computing system 104 to establish a secure connection with the manageability controller 118 any time, and maintain a continuous interaction with the manageability controller 118 through-out the life-cycle of the host computing system 102.

In some examples, each hub of the plurality of peripheral device hubs 120 may include a plurality of peripheral ports 124. Each hub of the plurality of peripheral device hubs 120 may also include a microcontroller 126 communicatively coupled to the plurality of peripheral ports 124 of the corresponding hub, and the port management IC 122. The microcontroller 126 may establish connection with a first peripheral device 128, when it is physically plugged to the at least one peripheral port 124, and negotiate with the first peripheral device 128 to obtain a first data corresponding to the first peripheral device 128 and the at least one peripheral port 124, to which the first peripheral device 128 is plugged. In some examples, the microcontroller 126 may use standard USB protocols for negotiating with the plurality of peripheral ports 124 and the port management IC 122.

In the example of FIG. 1, the plurality of peripheral device hubs 120 includes a first peripheral device hub 120A coupled to a peripheral side 130 of the host computing system 102, a second peripheral device hub 120B coupled to a front side 132 of the host computing system 102, and a third peripheral device hub 120C coupled to a rear side 134 of the host computing system 102. Further, the first peripheral device hub 120A includes two peripheral ports, for example, a first peripheral port 124A, and a second peripheral port 124B, and a first microcontroller 126A communicatively coupled to the first and second peripheral ports 124A, 124B respectively. Similarly, the second peripheral device hub 120B includes three peripheral ports, for example, a third peripheral port 124C, a fourth peripheral port 124D, and the fifth peripheral port 124E, and a second microcontroller 126B communicatively coupled to the third, fourth, and fifth peripheral ports 124C, 124D, 124E respectively. The third peripheral device hub 120C includes two peripheral ports, for example, a sixth peripheral port 124F and a seventh peripheral port 124G, and a third microcontroller 126C communicatively coupled to the sixth and seventh peripheral ports 124F, 124G respectively. In non-limiting example, the third peripheral device hub 120C may also include a virtual port 124H, In such examples, each port of the plurality of peripheral ports 124 may include a port identifier, which is unique or distinctive to the respective peripheral port. For example, the first peripheral port 124A may have a port identifier as "PP-1101", the second peripheral port 124B may have a port identifier as "PP-1102", the third peripheral port 124C may have a port identifier as "PP-2201", the fourth peripheral port 124D may have a port identifier as "PP-2202", the fifth peripheral port 124E may have a port identifier as "PP-2203", the sixth peripheral port 124F may have a port identifier as "PP-3301", and the seventh peripheral port 124G may have a port identifier as "PP-3302". In some examples, each of the plurality of peripheral ports 124 may be a physical port. In one or more examples, each of the plurality of peripheral device hubs 120 is a universal serial bus (USB) hub, and each of the plurality of peripheral ports 124 is a USB port. The functionalities of the plurality of peripheral device hubs 120 and the plurality of peripheral ports 124 are described in greater details below, In one or more examples, the port management IC 122 may be a hardware module operably coupled to the mother board of the host computing system 102. In such examples, the hardware module may include a processing resource (not shown in FIG. 1) for implementing functionalities of the port management IC 122 by executing program instructions stored in a machine readable medium (not shown in FIG. 1) of the hardware module. The port management IC 122 may operate as a centralized port manager of the host computing system 102 to regulate access to each of the plurality of peripheral ports 124 belonging to the plurality of peripheral device hubs 120, from the first peripheral device 128. In other words, the port management IC 122 is communicatively coupled to the plurality of peripheral device hubs 120, the manageability controller 118, and the CPU 114, to centrally regulate the access to each port of the plurality of peripheral ports 124 from the first peripheral device 128. In some examples, the port management IC 122 may be coupled to the microcontroller 126 of each hub of the plurality of peripheral device hubs 120 to receive the first data. Further, the port management IC 122 may be coupled to the manageability controller 118 to communicate the first data to the manageability controller 118, and receive at least one security action from the manageability controller 118. The port management IC 122 may be further coupled to each of the plurality of peripheral ports 124 to directly implement the at least one action on a corresponding peripheral port 124. In some examples, the security actions may include accepting the first peripheral device 128, rejecting the first peripheral device 128, and disabling the at least one port 124. The functionalities of the port management IC 122 is described in greater details below.

In some examples, the example data center environment 100 may include the first peripheral device 128, for example, a USB device. The first peripheral device 128 may have a plurality of first device identifiers associated to it. In some non-limiting examples, the plurality of first device identifiers may include a vendor identifier, a class description, and a sub-class description. In one example, the vendor identifier may provide information about manufacturer of the first peripheral device 128. It may be noted herein that the vendor identifier is a standard identifier, which is unique or distinctive for each manufacturer. For example, the vendor identifier for a manufacturer "A" may be "PD-AAA", for example. Similarly, the vendor identifier for another manufacturer "B" may be "PD-BBB", and for yet another manufacturer "C" may be "PD-CCC". Further, the class description may provide a broad category to which the first peripheral device 128 belongs to. For example, the class description for the first peripheral device 128 may be classified as "human interface device", or "mass storage device", or "network device", or "vision control device", and the like, based on the type of the first peripheral device 128. It may be noted herein that the class description may be standardized, and unique or distinctive across all manufacturers. For example, the class description relating to the human interface device may be categorized as "PD-HID", for example. Similarly, the class description for the mass storage device may be categorized as "PD-STO", for the network device may be categorized as "PD-NET", and for the vision control interface may be categorized as "PD-VCI". Further, each class description may be sub-categorized into the sub-class description. For example, the class description of the human interface device "PD-HID" may be further sub-classified as "keyboard" or "mouse", for example. In such examples, the sub-class description of the keyboard may be "PD-KEY", for example. Similarly, the sub-class description for the mouse may be "PD-MOU", for example.

The external computing system 104 may also include a plurality of peripheral ports 136. In some examples, each port of the plurality of peripheral ports 136 may be a USB port. In one or more examples, the first peripheral device 128 may also be plugged to the at least one peripheral port of the plurality of peripheral ports 136 of the external computing system 104 and may be mounted on the host computing system 102 via the virtual port 124H. The method of securely mounting the first peripheral device 128 on the host computing system 102 is described in greater details below.

During operation, the administrator 106 may securely login to the host computing system 102 and store a second data including a plurality of access control rules and security actions in the manageability controller 118. If the second data is already stored in the manageability controller 118, the administrator 106 may update the access control rules and/or the security actions, based on the business requirements. In some examples, the administrator 106 may access the web-console 108 to store/update the second data in the memory of the manageability controller 118. In some other examples, the administrator 106 may use the command-line interface 110 to store/update the second data in the memory of the manageability controller 118. In such examples, the administrator 106 may use a representational state transfer (RESTful) command for storing or updating the second data via the command-line interface 110, A sample second data including the plurality of access control rules and the security actions may be represented as shown in Table-1 below.

TABLE 1

| | | ACCESS CONTROL RULES | | | |
|---|---|---|---|---|---|
| ACCESS CONTROL | PERIPHERAL | PLURALITY OF SECOND PERIPHERAL DEVICE IDENTIFIERS | | | |
| RULE NOS. | PORT IDENTIFIERS | VENDOR IDENTIFIER | CLASS DESCRIPTION | SUB-CLASS DESCRIPTION | SECURITY ACTIONS |
| 1 | PP-2201 OR PP-2202 OR PP-2203 | PD-ANY | PD-HID | PD-KEY OR PD-MOU | ACCEPT |
| 2 | PP-1101 OR PP-1102 | PD-ANY | PD-HID | PD-KEY OR PD-MOU | REJECT |
| 3 | PP-3301 OR PP-3202 | PD-ANY | PD-HID | PD-KEY OR PD-MOU | REJECT |
| 4 | PP-ALL | PD-ANY | PD-VCI | PD-CAM | DISABLE, LOG |
| 5 | PP-2201 OR P3301 | PD-AAA OR PD-BBB OR PD-CCC | PD-STO | PD-ANY | ACCEPT |
| 6 | PP-2201 OR PP-2202 OR PP-2203 | PD-ANY | PD-STO | PD-ANY | REJECT |
| 7 | PP-2201 OR PP-2202 OR PP-2203 | PD-ANY | PD-NET | PD-ANY | REJECT |
| 8 | PP-1101 OR PP-1102 OR | PD-BBB | PD-STO OR PD-NET | PD-ANY | ACCEPT |

TABLE 1-continued

ACCESS CONTROL RULES

| ACCESS CONTROL RULE NOS. | PERIPHERAL PORT IDENTIFIERS | PLURALITY OF SECOND PERIPHERAL DEVICE IDENTIFIERS | | | SECURITY ACTIONS |
|---|---|---|---|---|---|
| | | VENDOR IDENTIFIER | CLASS DESCRIPTION | SUB-CLASS DESCRIPTION | |
| 9 | PP-3301 OR PP-3202 PP-ALL | PD-ANY | PD-OUT | PD-PRI | ACCEPT |

In the shown example, the sample Table-1 has nine nos. of access control rules, each linked to at least one security action to regulate the access to the plurality of peripheral ports 124 of the host computing system 102. Referring to Table-1, below, each access control rule has at least one predetermined peripheral port identifier mapped to a plurality of predetermined device identifiers of a second peripheral device. Further, each access control rule is linked to the at least one security action. In some examples, the security actions may include accepting the first peripheral device 128, rejecting the first peripheral device 128, and disabling the at least one peripheral port 124.

Referring to the first access control rule in Table-1, the third, fourth, and fifth peripheral ports 124C, 124D, 124E respectively, belonging to the second peripheral device hub 120B are mapped to the second peripheral device that are manufactured by "ANY" vendors, representing "human interface device" class description, and having the "keyboard" or the "mouse" sub-class descriptions. In such example, the first access control rule is linked to the at least one security action as "accepting" the first peripheral device 128.

In the second access control rule, the first and second peripheral ports 124A, 124B respectively, belonging to the first peripheral device hub 120A are mapped to the second peripheral device that is manufactured by "ANY" vendors, representing "human interface device" class description, and having the "keyboard" or the "mouse" sub-class descriptions. In such example, the second access control rule is linked to the at least one security action as "rejecting" the first peripheral device 128.

In the third access control rule, the sixth and seventh peripheral ports 124F, 124G respectively, belonging to the third peripheral device hub 120C are mapped to the second peripheral device that is manufactured by "ANY" vendors, representing "human interface device" class description, and having the "keyboard" or the "mouse" sub-class descriptions. In such example, the third access control rule is linked to the at east one security action as "rejecting" the first peripheral device 128.

In the fourth access control rule, the plurality of peripheral ports 124 having the port identifier as "PP-ALL" is mapped to the second peripheral device that is manufactured by "ANY" vendors, representing "visual control interface" class description, and having a "camera" sub-class description. In such example, the fourth access control rule is linked to the at least one security action as "disable" the peripheral port 124 and making "log" entry about the security action implemented on the peripheral port 124 in a log file (not shown) of the host computing system 102.

In the fifth access control rule, the third and sixth peripheral ports 124C, 124F respectively, belonging to the second and third peripheral device hubs 120B, 120O respectively are mapped to the second peripheral device that is manufactured by vendors, such as "A", "B", or "C", representing "mass storage device" class description, and having "ANY" sub-class description. In such example, the fifth access control rule is linked to the at least one security action as "accepting" the first peripheral device 128.

In the sixth access control rule, the third, fourth, and fifth peripheral ports 124C, 124D, 124E respectively, belonging to the second peripheral device hub 120B is mapped to the second peripheral device that is manufactured by "ANY" vendors, representing "mass storage device" class description, and having "ANY" sub-class description. In such example, the sixth access control rule is linked to the at least one security action as "rejecting" the first peripheral device 128.

In the seventh access control rule, the third, fourth, and fifth peripheral ports 124C, 124D, 124E respectively, belonging to the second peripheral device hub 120B is mapped to the second peripheral device that is manufactured by "ANY" vendors, representing "network device" class description, and having "ANY" sub-class description. In such example, the seventh access control rule is linked to the at least one security action as "rejecting" the first peripheral device 128.

In the eighth access control rule, the first, second, sixth, and seventh peripheral ports 124A, 123B, 124F, 124G respectively, belonging to the first and third peripheral device hubs 120A, 120C respectively are mapped to the second peripheral device that is manufactured by a vendor, such as "B", representing class description, such as "mass storage device, or network device", and having "ANY" sub-class description. In such example, the eight access control rule is linked to the at least one security action as "accepting" the first peripheral device 128.

In the ninth access control rule, the plurality of peripheral ports 124 having the port identifier as "PP-ALL" is mapped to the second peripheral device that is manufactured by "ANY" vendors, representation the "output class" description, and having a "printer" sub-class description. In such example, the ninth access control rule is linked to the at least one security action as "accepting" the first peripheral device 128.

In one or more examples, the plurality of access control rules and the corresponding security actions are defined by the administrator 106 of the data center environment 100. In some examples, the administrator 106 may obtain required inputs/information from the one or more customers, whose workloads are being hosted in the host computing system 102, for formulating each of the plurality of access control rules. In other words, the at least one security action linked to the each access control rule is determined based on a type of the second peripheral device, that the one or more customers have permitted for usage in the data center environment 100. For example, the second peripheral device belonging to "visual control interface" class description may be a security threat (e.g., a physical security and digital security) to the data center environment 100. Accordingly, the one or more customers may have provided instructions to the administrator 106 to take stringent actions against usage of such type of second peripheral device, thereby "disabling" the peripheral port 124 by turning the power-off to the peripheral port 124. It may be noted herein, when the peripheral port 124 is disabled, it becomes completely inactive or non-responsive for any future action on that particular peripheral port, until the administrator 106 intervenes and makes settings changes to that peripheral port 124, for example, by turning the power-on to bring back that particular peripheral port to the active state.

During operation or usage, the administrator 106 or any user who have access to the data center environment 100, for example, may physically plug the first peripheral device 128 to the host computing system 102 either to put information into and get information out of the host computing system 102.

In one present example, the user may plug the first peripheral device 128 having vendor identifier as "PD-BBB", the class description as "PD-HID", and the sub-class description as "PD-KEY" to the first peripheral port 124A having the peripheral port identifier as "PP-1101". In such cases, upon plugging of the first peripheral device 128 into the first peripheral port 124A, the first peripheral device hub 120A may become active. The first microcontroller 126A belonging to the first peripheral device hub 120A, may inform the port management IC 122 about plugging of the first peripheral device 128 in the host computing system 102. Later, the first microcontroller 126A may negotiate with the first peripheral device 128 and the first peripheral port 124A to obtain the first data including the peripheral port identifier of the first peripheral port 124A and the plurality of device identifiers of the first peripheral device 128. In some examples, the first microcontroller 126A may use standard USB protocols for negotiating with the plurality of peripheral ports 124 and the port management IC 122. In the present example, the peripheral port identifier may be "PP-1101" and the plurality of device identifiers may be "PD-BBB", "PD-HID", and "PD-KEY". The port management IC 122 may later query the first microcontroller 126A to receive the first data from the first microcontroller 126A. Subsequently, the port management IC 122 may establish a secure connection with the manageability controller 118, and communicate the first data to the manageability controller 118.

In some examples, the manageability controller 118 may compare the first data received from the port management IC 122, with the second data including the plurality of access control rules stored in the memory of the manageability controller 118, to determine the at least one security action. In the present example, the manageability controller 118 may apply the second access control rule listed in Table-1, as the peripheral port identifier of the first peripheral port 124A and each of the plurality of peripheral device identifiers of the first peripheral device 128, received from the first data matches with the condition set forth in the second access control rule, in Table-1. For example, the port identifier, such as "PP-1101" of the first peripheral port 124A, and the plurality of peripheral device identifiers, such as "PD-BBB", "PD-HID", and "PD-KEY" of the first peripheral device 128 matches with predetermined peripheral port identifier, such as "PP-1101", and the plurality of predetermined peripheral device identifiers, such as "PD-BBB", "PD-HID", and "PD-KEY" of the second peripheral device, as listed in the second access control rule of Table-1, Accordingly, the manageability controller 118 may choose the at least one security action linked to the second access control rule, for example, "reject" the first peripheral device 128, Subsequently, the port management IC 122 may query the manageability controller 118 to receive the at least one security action chosen from the manageability controller 118, as "reject" the first peripheral device 128.

The port management IC 122 may then directly interact with the first peripheral port 124A to implement the at least one security action chosen from the manageability controller 118. In some examples, the port management IC 122 may use standard USB protocols for implementing the at least one security action on the plurality of peripheral ports 124. In the present example, the port management IC 122 may not establish a communication link with the first peripheral device 128 via the first peripheral port 124A, so as to prevent the first peripheral device 128 to get recognized and/or listed in the operating system (OS) interface for usage by the user. It may be noted herein, that the port management IC 122 may perform all of the aforementioned functionalities in the background, i.e., without interacting with the CPU 114/the operating system of the host computing system 102, so as to insulate the OS and other hardware's of the host computing system 102 from the first peripheral device 128, until it is approved/accepted for usage.

In another example, the user may plug the first peripheral device 128 manufactured by "ANY" vendors (i.e., having vendor identifier as "PD-ANY"), the class description as "PD-HID", and the sub-class description as "PD-MOU" to the third peripheral port 124C having the peripheral port identifier as "PP-2101". In such cases, upon plugging of the first peripheral device 128 into the third peripheral port 124C, the second peripheral device hub 120B may become active. The second microcontroller 126C belonging to the second peripheral device hub 120B, may inform the port management IC 122 about plugging of the first peripheral device 128 in the host computing system 102. The second microcontroller 126C may negotiate with the first peripheral device 128 and the third peripheral port 124C to obtain the first data including the peripheral port identifier of the third peripheral port 124C and the plurality of device identifiers of the first peripheral device 128. In such examples, the peripheral port identifier may be "PP-2201" and the plurality of device identifiers may be "PD-ANY", "PD-HID", and "PD-MOU". The port management IC 122 may later query the second microcontroller 126B to receive the first data from the second microcontroller 126B. Subsequently, the port management IC 122 may establish the secure connection with the manageability controller 118, and communicate the first data to the manageability controller 118.

In some examples, the manageability controller 118 may compare the first data received from the port management IC 122, with the second data including the plurality of access control rules stored in the memory of the manageability controller 118, to determine the at least one security action. In the such examples, the manageability controller 118 may apply the first access control rule listed in Table-1, as the peripheral port identifier of the third peripheral port 124C and each of the plurality of peripheral device identifiers of the first peripheral device 128, received from the first data matches with the condition set forth in the first access control rule, in Table-1. For example, the peripheral port identifier, such as "PP-2201" of the third peripheral port 124C and each of the plurality of peripheral device identifiers, such as "PD-ANY", "PD-HID", and "PD-MOU" of the first peripheral device 128 matches with the predetermined peripheral port identifier "PP-2201" and each of the plurality of predetermined peripheral device identifiers, such as "PD-ANY", "PD-HID", and "PD-MOU" of the second peripheral device, as listed in the second access control rule of Table-1. Accordingly, the manageability controller 118 may choose the at least one security action linked to the first access control rule, for example, "accept" the first peripheral device 128. Subsequently, the port management IC 122 may query the manageability controller 118 to receive the at least one security action chosen from the manageability controller 118, as "accept" the first peripheral device 128.

The port management IC 122 may then directly interact with the third peripheral port 124C to implement the at least one security action chosen from the manageability controller 118. In the present example, the port management IC 122 may establish the communication link to the first peripheral device 128 via the third peripheral port 124C, so that the first peripheral device 128 may get recognized and/or listed in the operating system (OS) interface for usage by the user. Later, the port management IC 122 may offload the usage of the first peripheral device 128 to the OS, until the first peripheral device 128 is unplugged or unmounted from the third peripheral port 124C. The aforementioned steps may repeat again, if the user re-mounts/re-plugs the first peripheral device 128, as discussed herein in the third peripheral port 124C.

It may be noted herein that the administrator 106 may have set the access control rules to allow the usage of the first peripheral device 128 manufactured from "ANY" vendor, having the class description as "human interface device", and the sub-class description as "keyboard" or "mouse", when it is plugged to any of the peripheral ports available in the front side 132 of the host computing system 102. While, the first peripheral device 128 having the class description as "mass storage device" or the "network device" is rejected, when such first peripheral device 128 is plugged into any of the peripheral ports available in the peripheral side 130 or the rear side 134 of the host computing system 102.

In certain other examples, the user may plug the first peripheral device 128 manufactured by "ANY" vendors (i.e., having vendor identifier as "PD-ANY"), the class description as "PD-VCI", and the sub-class description as "PD-CAM" to any of the plurality of peripheral ports 124 (i.e., having peripheral port identifier as "PP-ALL"). In such cases, upon plugging of the first peripheral device 128 into any of the plurality of peripheral ports 124, for example, a fourth peripheral port 124D, a corresponding peripheral device hub, for example, the second peripheral device hub 120B may become active. The second microcontroller 126B corresponding to the second peripheral device hub 120B, may inform the port management IC 122 about plugging of the first peripheral device 128 in the host computing system 102. The second microcontroller 126B may then negotiate with the first peripheral device 128 and the fourth peripheral port 124D to obtain the first data including the peripheral port identifier of the fourth peripheral port 124D and the plurality of device identifiers of the first peripheral device 128. In such examples, the peripheral port identifier may be "PP-2202" and the plurality of device identifiers may be "PD-ANY", "PD-VCI", and "PD-CAM". The port management IC 122 may later query the second microcontroller 126B to receive the first data from the second microcontroller 126B. Subsequently, the port management IC 122 may establish the secure connection with the manageability controller 118, and communicate the first data to the manageability controller 118.

In some examples, the manageability controller 118 may compare the first data received from the port management IC 122, with the second data including the plurality of access control rules stored in the memory of the manageability controller 118, to determine the at least one security action. In the such examples, the manageability controller 118 may apply the fourth access control rule listed in Table -1, as the peripheral port identifier of the fourth peripheral port 124D and each of the plurality of peripheral device identifiers, received from the first data matches with the condition set forth in the fourth access control rule, in Table-1. For example, the peripheral port identifier, such as or "PP-2202" or "PP-ANY" of fourth peripheral port 124D and each of the plurality of peripheral device identifiers, such as "PD-ANY", "PD-VCI", and "PD-CAM" of the first peripheral device 128 matches with the predetermined peripheral port identifier "PP-2202" or "PP-ANY" and each of the plurality of predetermined peripheral device identifier, such as "PD-ANY", "PD-VCI", and "PD-CAM" of the second peripheral device, as listed in the fourth access control rule of Table-1. Accordingly, the manageability controller 118 may choose the security action linked to the fourth access control rule, for example, "disable" the peripheral port 124 and "log" the security action. Subsequently, the port management IC 122 may query the manageability controller 118 to receive the security action from the manageability controller 118, as "disable" the fourth peripheral port 124D and "log" the security action.

The port management IC 122 may then directly interact with the fourth peripheral port 124D to implement the security action chosen from the manageability controller 118. In the present example, the port management IC 122 may turn-off the power supply to the fourth peripheral port 124D, so that the first peripheral device 128 may not get recognized and/or listed in the operating system (OS) interface for usage by the user. Further, the port management IC 122 may make "log" entry about the security action implemented on the peripheral port 124 in a log file (not shown) of the host computing system 102. It may be noted herein, when the fourth peripheral port 124D is disabled, it becomes completely inactive or non-responsive for any future action on that particular port, until the administrator 106 change settings of that peripheral port 124 and turn-on the power supply back to get the fourth peripheral port 124D into active state.

In some examples, the administrator 106 or any other user may plug the first peripheral device 128 to one of the plurality of peripheral ports 136 of the external computing system 104. Later, the user may try to mount the first peripheral device 128 to the host computing system 102 via the virtual port 124H. For example, the user may access the web-console 108 of the external computing system 104 and try to mount the first peripheral device 128 plugged to the external computing system 104, to the host computing system 102 via the virtual port 124H. In such examples, the manageability controller 118 may receive the first data corresponding to the plurality of peripheral device identifiers of the first peripheral device 128 and the port identifier of the peripheral port 136 from the external computing system 104. For example, the port identifier of the peripheral port 136 may be "PP-ALL" and the plurality of peripheral device identifiers of the first peripheral device 128 may be "PD-ANY", "PD-OUT", and "PD-PRI". Then, the manageability controller 118 may compare the first data with the second data stored with the manageability controller 118 to determine at least one security action, as discussed hereinabove. Once, the at least one security action is determined the manageability controller 118 may implement such security action on the virtual port 124H of the host computing system 102.

In the present example, since the peripheral port identifier is "PP-ALL" and the plurality of peripheral device identifiers is "PP-ANY", "PP-OUT", and "PP-PRI". The first data matches with the condition set forth in the ninth access control rules of the second data (referring to TABLE-1). Accordingly, the manageability controller 118 may choose the at least one security action as "accept" the first peripheral device 128, and may implement the at least one security action of mounting the first peripheral device 128 to the host computing system 102 via the virtual port 124H.

In some examples, the port management IC 122 may further make an entry of the at least one security action implemented on the at least one peripheral port 124, upon plugging or mounting of the first peripheral device 128 to the at least one peripheral port 124, in a log file. In some examples, the log files may be either stored in the host computing system 102 and may be accessed by the administrator 106. In some other examples, the log files may be directly stored in the external computing system 104. It may be noted herein, that the administrator 106 may analyze the log file entries to determine any patterns of usage of the peripheral device in any specific peripheral port or maximum usage of the peripheral device manufactured by a particular vendor, and the like. Later, the administrator 106 may use the knowledge derived from the analysis of the patterns, while formulating/revising/updating the access control rules.

Figure 2:
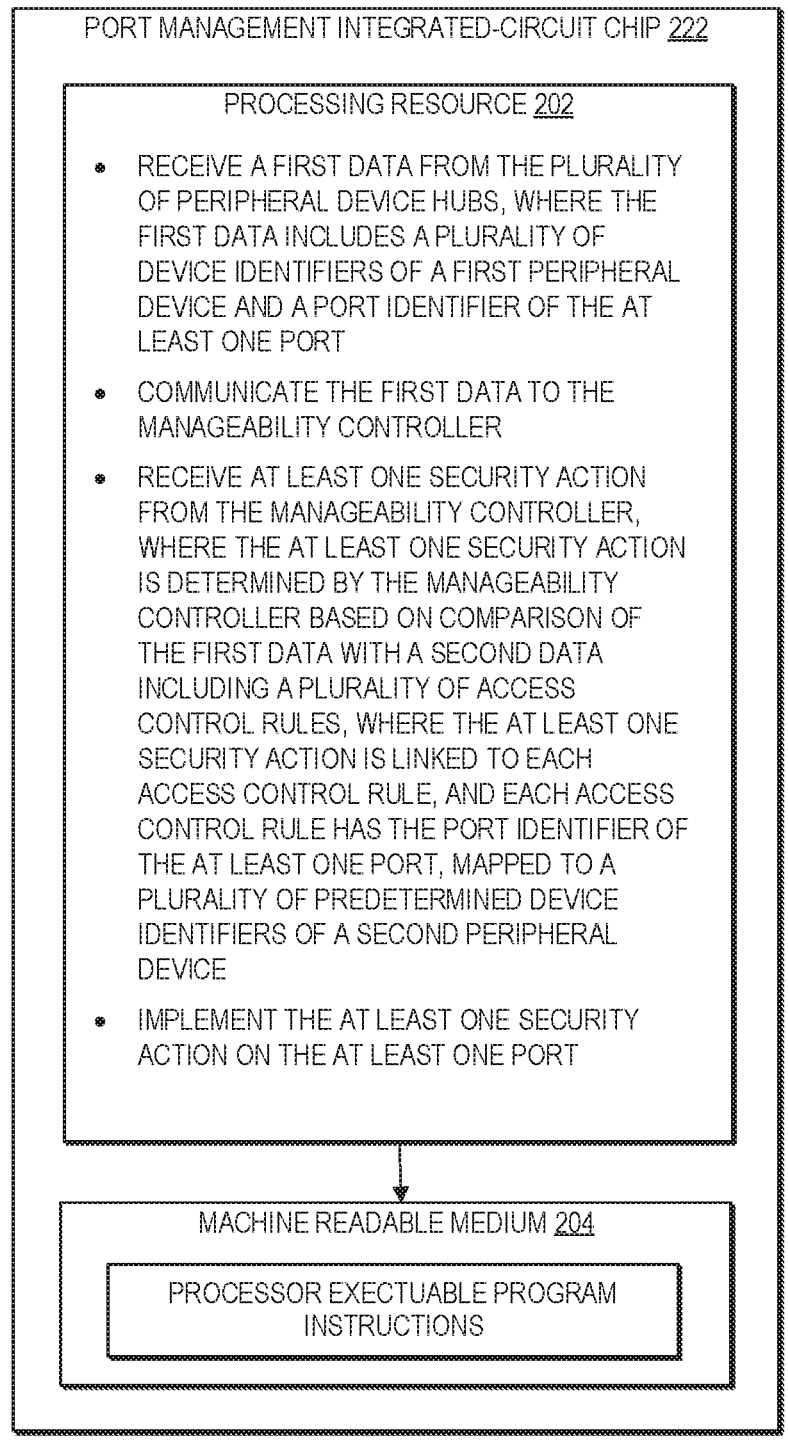
FIG. 2 is a block diagram depicting a port management integrated-circuit chip (IC) having a processing resource operably coupled to a machine readable medium storing executable program instructions, in accordance with embodiments of the present disclosure.

FIG. 2 is a block diagram of a computing system, for example, a port management integrated-circuit chip (IC) 222 including a processing resource 202 and a machine readable medium 204 storing executable program instructions. It should be noted herein that the port management IC referred to in FIG. 2 may be same or similar to port management IC 122 described in FIG. 1. In the example embodiment, the processing resource 202 is operably coupled to the machine readable medium 204.

The processing resource 202 may be a physical processor. In some examples, the physical processor may be at least one of a central processing unit (CPU), a graphics processing unit (GPU), a microprocessor, and/or other hardware devices suitable for performing the functionality described in relation to FIG. 1. In some examples, the machine readable medium 204 is non-transitory and is alternatively referred to as a non-transitory machine readable medium.

The processing resource 202 executes one or more program instructions to perform one or more functions described in FIG. 1. For example, the processing resource 202 may execute program instructions to receive a first data from the plurality of peripheral device hubs. In some examples, the first data includes a plurality of device identifiers of a first peripheral device and a port identifier of the at least one peripheral port. In some examples, each hub of the plurality of peripheral device hubs is a universal serial bus (USB) hub. Similarly, the peripheral device is a USB device, and the at least one peripheral port is a USB port.

The processing resource 202 may later communicate the first data received from the plurality of peripheral device hubs to a manageability controller. In some examples, the processing resource may execute the program instructions to establish a secure connection with the manageability controller before communicating the first data. Subsequently, the processing resource 202 may query the manageability controller to receive one or more security action from the manageability controller. In some examples, the security action(s) may include accepting the first peripheral device, rejecting the first peripheral device, or disabling the at least one peripheral port. In one or more examples, the security action is determined by the manageability controller based on comparison of the first data with a second data including a plurality of access control rules. In this example, the security action is linked to each access control rule, and each access control rule has the port identifier of the at least one peripheral port, mapped to a plurality of predetermined device identifiers of a second peripheral device. The steps of determining the security action(s) by the manageability controller is described in conjunction with FIG. 1

The processing resource 202 may further execute the program instructions to directly implement the at least one security action on the at least one peripheral port, as described in conjunction with FIG. 1. In some examples, the processing resource 202 may not establish the communication link with the peripheral device via the at least one peripheral port to prevent the peripheral device 128 to get recognized and/or listed in the operating system (OS) interface for usage by the user. In some other examples, the processing resource 202 may establish the communication link with the peripheral device via the at least one peripheral port. In certain other examples, the processing resource 202 may turn-off the power supply to the at least one peripheral port.

Figure 3:
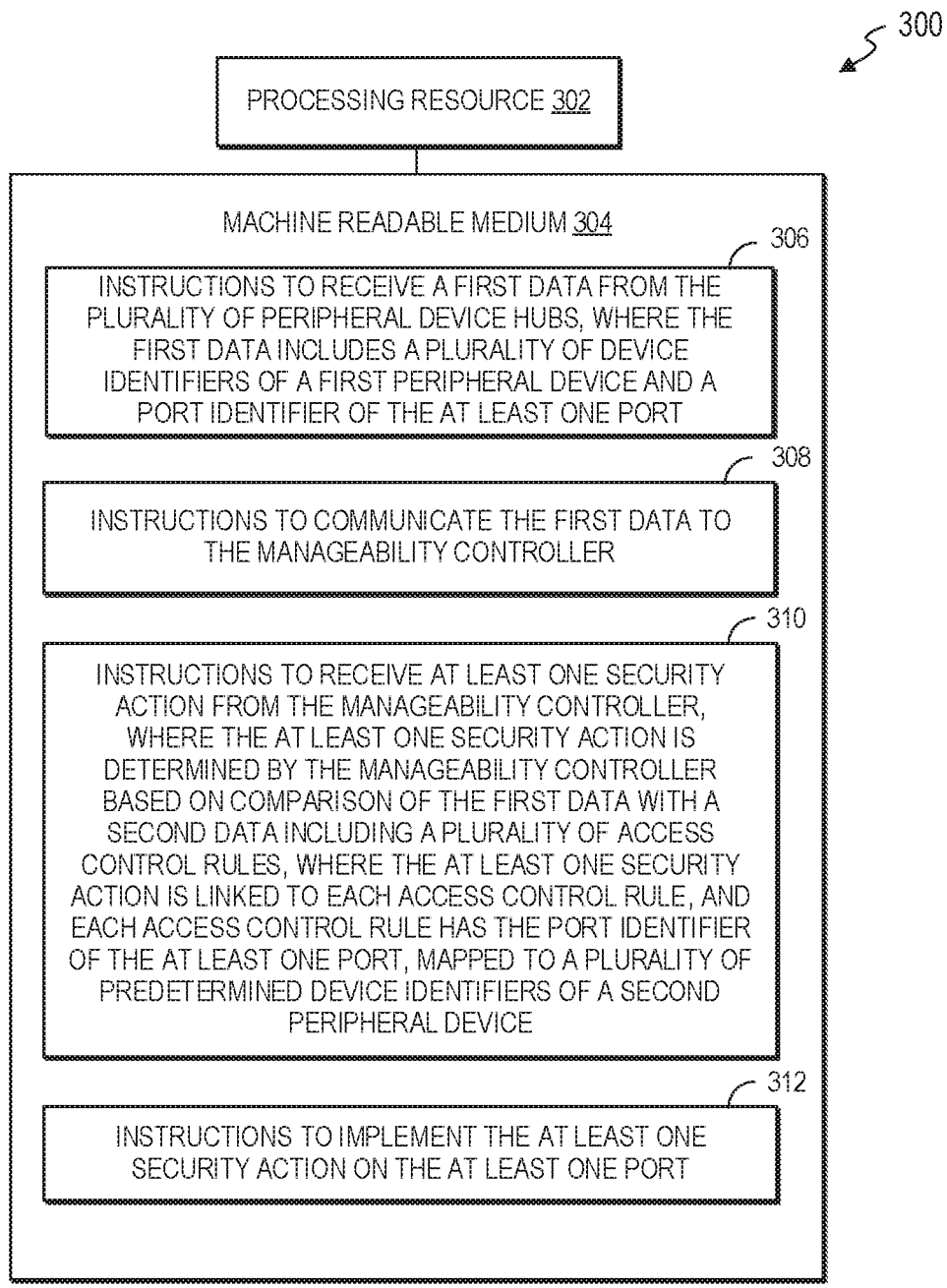
FIG. 3 is a block diagram depicting a processing resource and a machine readable medium encoded with example instructions to process data in a port management integrated-circuit chip (IC), in accordance with embodiments of the present disclosure.

FIG. 3 is a block diagram 300 depicting a processing resource 302 and a machine readable medium 304 encoded with example instructions to process data by a port management integrated-circuit chip (IC). In some examples, the port management IC is operated in an example environment 100 (as shown in FIG. 1), for regulating access to at least one peripheral port of a host computing system, from a peripheral device. It should be noted herein that the port management IC referred to in FIG. 3 may be same or similar to port management IC 122, 222 described in FIGS. 1 and 2 respectively. The machine readable medium 304 is non-transitory and is alternatively referred to as a non-transitory machine readable medium. In some examples, the machine readable medium 304 may be accessed by the processing resource 302. In some examples, the machine readable medium 304 stores the program instructions corresponding to functionality of a port management IC, as discussed in FIG. 1.

The machine readable medium 304 may be encoded with example instructions 306, 308, 310, 312. In some examples, an administrator of the host computing system may access a manageability controller of the host computing system and store/edit a second data including a plurality of access control rules and security actions linked to each of the plurality of access control rules.

The instruction 306, when executed by the processing resource 302, may implement aspects of receiving a first data from a plurality of peripheral device hubs. In some examples, the first data includes a plurality of device identifiers of a first peripheral device and a port identifier of at least one peripheral port. A corresponding of the plurality of peripheral device hubs, to which the peripheral port is attached may negotiate with the peripheral device and the at least one peripheral port to obtain the first data. In some examples, each hub of the plurality of peripheral device hubs is a universal serial bus (USB) hub. Similarly, the peripheral device is a USB device, and the at least one peripheral port is a USB port. The step of receiving the first data from the plurality of peripheral device hubs is described in details in FIG. 1.

The instruction 308, when executed, may cause the processing resource 302 to communicate the first data received from the plurality of peripheral device hubs to the manageability controller, as described in FIG. 1. In some examples, the processing resource 302 of the port management IC may establish a secure connection with the manageability controller and transfer the first data to the manageability controller.

The instruction 310, when executed, may cause the processing resource 302 to receive at least one security action from the manageability controller, as described in FIG. 1. As discussed in FIG. 1, the port management IC may query the manageability controller to receive the at least one security action. In some examples, the manageability control may compare the first data with the second data to determine the at least one security action, as described in FIG. 1.

Further, the instructions 312, when executed, may cause the processing resource 302 to implement the at least one security action on the at least one peripheral port, as described in FIG. 1. In some examples, the at least one security action may include accepting the peripheral device, rejecting the peripheral device, or disabling the at least one peripheral port. In some examples, the processing resource 302 may reject the peripheral device by not establishing the communication link with the peripheral device via the at least one peripheral port. Similarly, the processing resource 302 may accept the peripheral device by establishing the communication link with the peripheral device via the at least one peripheral port. In certain other examples, the processing resource 302 may disable the at least one peripheral port by turning-off the power supply to the at least one peripheral port.

FIG. 4 is a flow diagram depicting a method 400 of regulating access to at least one peripheral port of a host computing system from a peripheral device in accordance to embodiments of the present disclosure. It should be noted herein that the method 400 is described in conjunction with FIG. 1.

The method 400 starts at block 402 and continues to block 404. At block 404, the method 400 includes receiving a first data from multiple peripheral device hubs of a host computing system, as described in FIG. 1. In one or more examples, when the peripheral device is attached (plugged/mounted) to the at least one peripheral port of the host computing system, a hub corresponding to the at least one peripheral port, may negotiate with the peripheral device and the at least one peripheral port to obtain the first data. In some examples, the first data may include a port identifier of the at least one peripheral port and the plurality of device identifiers of the peripheral device. In some examples, each hub of the plurality of peripheral device hubs is a universal serial bus (USB) hub. Similarly, the peripheral device is a USB device, and the at least one peripheral port is a USB port.

Further, the method 400 continues to block 406. At block 406, the method 400 includes communicating the received first data to a manageability controller of the host computing system, as described in FIG. 1. In some examples, the port management IC may establish a secure connection with the manageability controller before communicating the first data to the manageability controller. In some examples, the manageability controller may be a baseboard management controller (BMC). The method 400 further continues at block 408.

At block 408, the method 400 includes receiving at least one security action from the manageability controller, as described in FIG. 1. In some examples, the port management IC may query the manageability controller to receive the at least one security action, In one or more examples, the at least one security action includes accepting the peripheral device, rejecting the peripheral device, or disabling the at least one peripheral port. The steps involved in determining the at least one security action is described in FIG. 1 and will be explained in description corresponding to FIG. 5. The method 400 continues to block 410.

At block 410, the method 400 includes directly implementing the at least one security action on the at least one peripheral port, as described in FIG. 1. In some embodiments, the port management IC may reject the peripheral device by not establishing the communication link with the peripheral device via the at least one peripheral port. Similarly, the port management IC may accept the peripheral device by establishing the communication link with the peripheral device via the at least one peripheral port. In certain other examples, the port management IC may disable the at least one peripheral port by turning-off the power supply to the at least one peripheral port, as described in details in conjunction to FIG. 1. The method 400 ends at block 412.

FIG. 5 is a flow diagram depicting a method 500 of determining at least one security action by a manageability controller, in accordance to embodiments of the present disclosure. It should be noted herein that the method 500 is described in conjunction with FIGS. 1 and 4.

The method 500 starts at block 502 and continues to block 504. At block 504, the method 400 includes receiving a first data from a port management IC, as described in FIGS. 1 and 4. In one or more examples, the first data may include a port identifier of the at least one peripheral port and the plurality of device identifiers of the peripheral device.

Further, the method 500 continues to block 506. At block 506, the method 500 includes receiving a second data including a plurality of access control rules from an administrator of a data center environment having a host computing system and an external computing system. In some examples, the administrator may access the manageability controller of the host computing system by either a secure web-console or a command-line interface and store/edit the second data including a plurality of access control rules and security actions linked to each of the plurality of access control rules in a memory of the manageability controller. In some examples, the administrator may use a RESTful commands to store/edit the access control rules in the manageability controller. As discussed in FIG. 1, the at least one security action is linked to each access control rule, and each access control rule has the port identifier of the at least one peripheral port, mapped to a plurality of predetermined device identifiers of a second peripheral device. The method 500 further continues at block 508.

At block 508, the method 500 includes determining at least one security action by the manageability controller, as described in FIG. 1. In some examples, the manageability controller may compare the first data with the second data to determine the at least one security action. In one or more examples, the manageability controller may first compare the port identifier of the at least one peripheral port received in the first data with the at least one predetermined port identifier of the at least one peripheral port stored in the second data. If the match is found that the manageability controller may shortlist only such access control rules, which has identical peripheral port identifiers and compare the plurality of device identifiers of the peripheral device received in the first data with the plurality of predetermined device identifiers of a second peripheral device, stored in the second data. According, the manageability controller may determine the access control rules, where the conditions between the first and second data are matched, and find the at least one security action linked to determined access control rule. The method 500 continues to block 510.

At block 510, the method 500 includes communicating the at least one security action to the port management IC, as described in FIG. 1. In some examples, the port management IC may query the manageability controller to receive the at least one security action. In one or more examples, the at least one security action includes accepting the peripheral device, rejecting the peripheral device, or disabling the at least one peripheral port. In some embodiments, the port management IC implement the at least one security action determined by the manageability controller. For example, the port management IC may reject the peripheral device by not establishing the communication link with the peripheral device via the at least one peripheral port. Similarly, the port management IC may accept the peripheral device by establishing the communication link with the peripheral device via the at least one peripheral port. In certain other examples, the port management IC may disable the at least one peripheral port by turning-off the power supply to the at least one peripheral port, as described in details in conjunction to FIG. 1. The method 500 ends at block 512.

Various features as illustrated in the examples described herein may be implemented to remediate security vulnerabilities originated due to unrestricted/unauthorized access to peripheral ports of host computing system using a peripheral device, thereby preventing theft of sensitive data from the host computing systems or introducing malicious (harmful) data into the host computing systems.

In the foregoing description, numerous details are set forth to provide an understanding of the subject matter disclosed herein. However, implementation may be practiced without some or all of these details. Other implementations may include modifications, combinations, and variations from the details discussed above. It is intended that the following claims cover such modifications and variations.

What is claimed is:

1. A host computing system comprising:
a port management integrated-circuit chip (IC), a plurality of peripheral device hubs, and a manageability controller, wherein each hub of the plurality of peripheral device hubs comprises at least one port,
wherein the port management IC comprises a machine readable medium storing program instructions, and a processing resource operably coupled to the machine readable medium, wherein the processing resource executes the program instructions to:
receive a first data from the plurality of peripheral device hubs, wherein the first data comprises a plurality of device identifiers of a first peripheral device and a port identifier of the at least one port;
communicate the first data to the manageability controller;
receive at least one security action from the manageability controller, wherein the at least one security action is determined by the manageability controller based on comparison of the first data with a second data comprising a plurality of access control rules, wherein the at least one security action is linked to each access control rule, and wherein each access control rule has the port identifier of the at least one port, mapped to a plurality of predetermined device identifiers of a second peripheral device; and
implement the at least one security action on the at least one port.

2. The host computing system of claim 1, wherein the at least one security action comprises at least one of accepting the first peripheral device, rejecting the first peripheral device, or disabling the at least one port.

3. The host computing system of claim 1, wherein a hub of the plurality of peripheral device hubs is to obtain the first data upon plugging or mounting of the first peripheral device to the at least one port belonging to the hub.

4. The host computing system of claim 1, wherein the processing resource further executes the program instructions to log the at least one security action implemented on the at least one port upon plugging or mounting of the first peripheral device to the at least one port, in a log file.

5. The host computing system of claim 1, wherein the at least one security action is linked to each access control rule is determined based on a type of the second peripheral device.

6. The host computing system of claim 1, wherein the at least one port comprises one of a physical port or a virtual port.

7. The host computing system of claim 1, wherein the first and second peripheral devices comprise a universal serial bus (USB) device.

8. The host computing system of claim 1, wherein the at least one port comprises a universal serial bus (USB) port.

9. The host computing system of claim 1, wherein the plurality of predefined device identifiers comprises a vendor identifier of the second peripheral device, a class description of the second peripheral device, and a sub-class description of the second peripheral device.

10. A method comprising:
receiving, by a port management integrated-circuit chip (IC) of a host computing system, a first data from a plurality of peripheral device hubs, wherein the first data comprises a plurality of device identifiers of a first peripheral device and a port identifier of at least one port;
communicating, by the port management IC, the first data to the manageability controller of the host computing system;
receiving, by the port management IC, at least one security action from the manageability controller, wherein the at least one security action is determined by the manageability controller based on comparison of the first data with a second data comprising a plurality of access control rules, wherein the at least one security action is linked to each access control rule, wherein each access control rule has the port identifier of the at least one port, mapped to a plurality of predetermined device identifiers of a second peripheral device, and wherein the manageability controller and the port management IC are discrete components; and
implementing, by the port management IC, the at least one security action on the at least one port.

11. The method of claim 10, wherein the at least one security action comprises at least one of accepting the first peripheral device, rejecting the first peripheral device, or disabling the at least one port.

12. The method of claim 10, further comprising, obtaining, by a hub of the plurality of peripheral device hubs, the first data upon plugging or mounting of the first peripheral device to the at least one port belonging to the hub.

13. The method of claim 10, further comprising, logging, by the port management IC, the at least one security action implemented on the at least one port upon plugging or mounting of the first peripheral device to the at least one port, in a log file.

14. The method of claim 10, wherein the at least one security action linked to each access control rule is determined based on a type of the second peripheral device.

15. The method of claim 10, wherein the at least one port comprises one of a physical port or a virtual port.

16. The method of claim 10, wherein the first peripheral device and the second peripheral device comprise a universal serial bus (USB) device, and wherein the at least one port comprises a universal serial bus (USB) port.

17. The method of claim 10, further comprising, one or more of receiving or updating, by the manageability controller, the second data through a web-console of the manageability controller or through a representational state transfer (RESTful) command.

18. The method of claim 10, wherein the plurality of predefined device identifiers comprises a vendor identifier of the second peripheral device, a class description of the second peripheral device, and a sub-class description of the second peripheral device.

19. A non-transitory machine readable medium storing instructions executable by a processing resource of a port management integrated-circuit chip (IC), the instructions comprising:

instructions to receive a first data from a plurality of peripheral device hubs, wherein the first data comprises a plurality of device identifiers of a first peripheral device and a port identifier of at least one port;

instructions to communicate the first data to a manageability controller of the host computing system;

instruction to receive at least one security action from the manageability controller, wherein the at least one security action is determined by the manageability controller based on comparison of the first data with a second data comprising a plurality of access control rules, wherein the at least one security action is linked to each access control rule, wherein each access control rule has the port identifier of the at least one port, mapped to a plurality of predetermined device identifiers of a second peripheral device, and wherein the manageability controller and the port management IC are discrete components; and instructions to implement the at least one security action on the at least one port.

20. The non-transitory machine readable medium of claim 19, wherein the at least one security action comprises at least one of accepting the first peripheral device, rejecting the first peripheral device, and disabling the at least one port.

* * * * *